(12) United States Patent
Balaraja Shetty et al.

(10) Patent No.: US 12,732,669 B2
(45) Date of Patent: Sep. 8, 2026

(54) RECOMMENDATION GENERATOR FOR MEDIA CONTENT SIGNALING SYSTEMS

(71) Applicant: DISH Network Technologies India Private Limited, Karnataka (IN)

(72) Inventors: Vikram Balaraja Shetty, Karnataka (IN); Manasa Jami, Visakhapatnam (IN); Visali Manoharan, Chennai (IN); Dileep Puramana, Kerala (IN)

(73) Assignee: DISH Network Technologies India Private Limited, Karnataka (IN)

( * ) Notice: Subject to any disclaimer, the term of this patent is extended or adjusted under 35 U.S.C. 154(b) by 0 days.

(21) Appl. No.: 19/036,652

(22) Filed: Jan. 24, 2025

(65) Prior Publication Data

US 2026/0222653 A1 Jul. 30, 2026

(51) Int. Cl.
*H04N 21/482* (2011.01)
*G06V 10/40* (2022.01)
*H04N 21/466* (2011.01)

(52) U.S. Cl.
CPC ......... *H04N 21/4826* (2013.01); *G06V 10/40* (2022.01); *H04N 21/4668* (2013.01)

(58) Field of Classification Search
None
See application file for complete search history.

(56) References Cited

U.S. PATENT DOCUMENTS

2012/0167144 A1* 6/2012 Avison-Fell ....... H04N 21/4728 725/51
2020/0159759 A1* 5/2020 Younessian ............ G06F 16/41

* cited by examiner

*Primary Examiner* — Samira Monshi
(74) *Attorney, Agent, or Firm* — Ashurst Perkins Coie US LLP

(57) ABSTRACT

The present disclosure is directed to techniques for generating recommendations based on visual content. A receiver device can receive a video stream comprising a set of frames, select at least one frame from the set of frames, and apply a computer vision model to the selected frame to extract object metadata for an object of interest. The object metadata can relate to at least one of a scene, person, character, channel identifier, or product identifier. Using the object metadata, the receiver device can execute a trained neural network to generate a set of recommended items. The trained neural network can be trained on program metadata, channel metadata, and/or scheduling metadata. The techniques can include generating and displaying an interactive program guide (IPG) that includes at least one item from the set of recommended items.

20 Claims, 7 Drawing Sheets

RECOMMENDATION GENERATOR FOR MEDIA CONTENT SIGNALING SYSTEMS

BACKGROUND

Media content signaling systems enable transmission and receipt of audiovisual content by various devices. For example, satellite media content signaling systems can transmit television programs through a network of satellites orbiting the Earth. Signals can be received at ground stations, uplinked to satellites, and broadcast back to Earth, where they can be received and decoded by subscriber devices, such as set-top boxes and/or digital video recorders (DVRs) for transmission to connected user devices, such as televisions. Conventional subscriber devices limit user ability to interact with media content beyond recording content, retrieving static metadata (e.g., movie information), and managing playback sessions. Users typically select content from static lists or from predetermined subsets of available content or channels.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
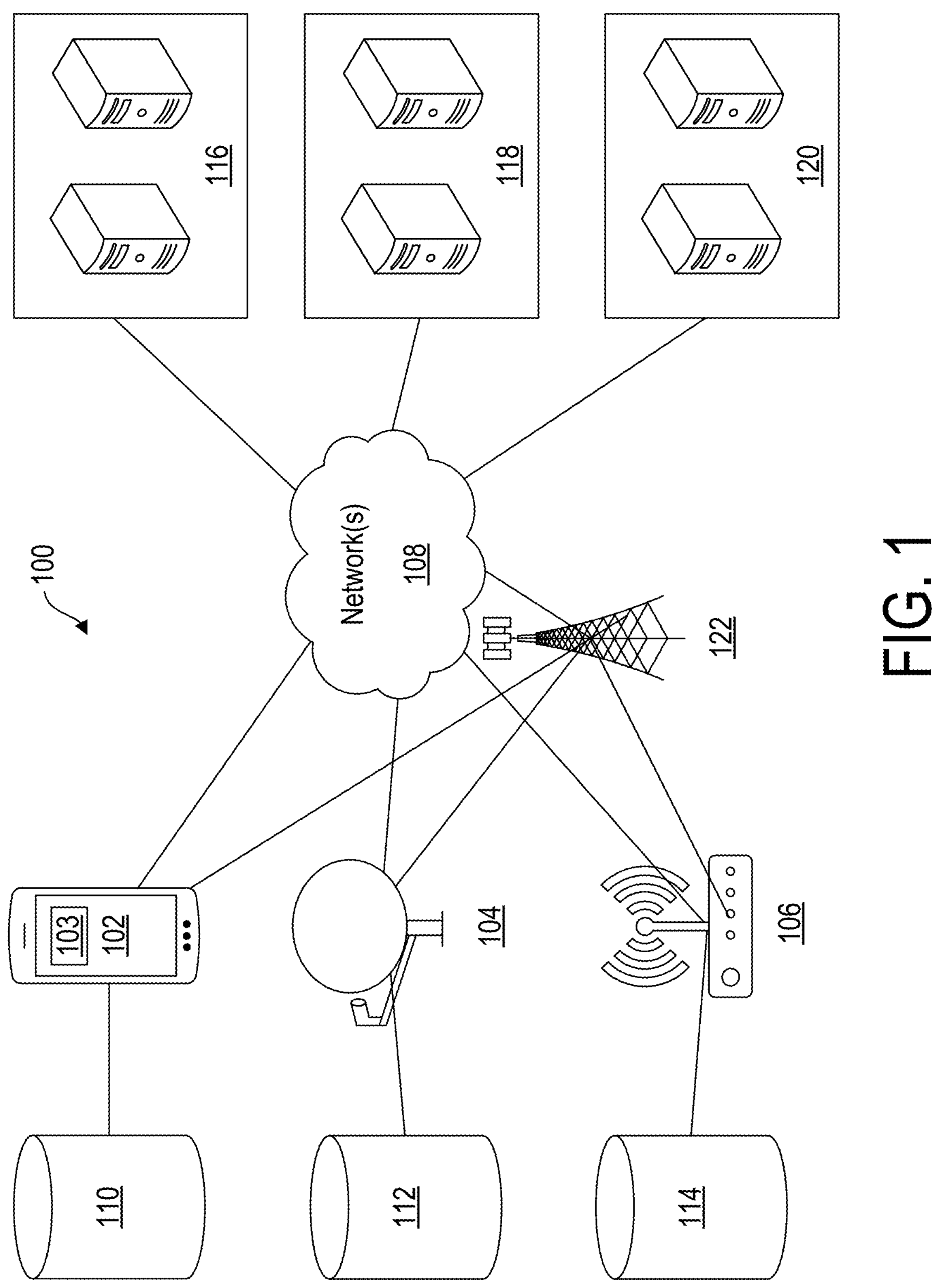
FIG. 1 illustrates an example distributed system for media content signaling, in accordance with one or more implementations of the present technology.

Aspects of the present disclosure are directed to systems, methods, and/or computer-readable media that implement AI based recommendation generators for media content signaling systems.

As used herein, the term "recommendation" can refer to an electronic program guide (EPG), interactive program guide (IPG), a home screen, a menu, a ribbon, a deck of displayable cards, a prompt, or another similar visual entity that can display broadcast schedules, display program information (programs, movies, channels, themes, broadcast times, durations, and so forth), guide users in selecting content, enable search and discovery of content, enable personalization of content sets, integrate streaming services, integrate third-party applications, integrate gaming platforms, and so forth. To that end, recommendations can include navigable items that, in response to receiving or detecting a user interaction with an input device (remote control, touch screen, joystick, computer mouse, and so forth), can invoke computer-executable code to access and display user-selected items, display additional screens, maximize windows, and so forth. In some use cases, recommendations can include curated channel and/or package recommendations (e.g., for channels or content items bundled in a particular way). In some use cases, the term "recommendation" can also refer to data suitable for processing by search engines, personal video recorders, and/or broadcast automation systems to schedule, retrieve, and/or serve content to consumers.

As used herein, the term "content" can refer to video content provided by streaming services, retrievable from local and/or cloud storage, received via cable, satellite, and/or over-the-air (OTA) broadcast signals, provided by an application, provided by a gaming platform, and so forth. Content can be encoded using suitable video codec(s), such as H.264, H.265, VP9, and/or AV1.

Conventionally, OTA antennas, set-top boxes, gateways, and other television signal receiver devices are limited in their ability to dynamically customize selectable content sets and playback options, particularly when media content that is consumed, at a client device, by a particular user or group includes distinct types of content or sets of content items from different providers. For example, a set of media content items can include streaming content, locally stored content, cable, satellite, OTA, gaming services, and/or applications. Conventional television signal receiver devices may not be capable of utilizing in-stream information to dynamically tune user recommendations. Additionally, conventional television signal receiver devices are not natively capable of consolidating dynamically curated sets of content items from different origins into displayable recommendations, such as IPGs.

The techniques disclosed herein address these technical problems. In an example, a computer vision-based recommendation system is deployed or accessible to a television signal receiver device. The system can include an AI based recommendation generator that can enhance content discovery. Example features enabled by the AI based recommendation generator for media content signaling can include video thumbnail analysis, scene detection, object/actor recognition, viewer attention tracking, emotion recognition, and/or viewing pattern analysis. These capabilities can enable personalized content recommendations and can enhance user experience as well as content monetization.

As described herein, an example recommendation generator can include software and/or hardware circuitry to perform the operations described here. For example, the recommendation generator can implement deep learning (e.g., using trained convolutional neural networks (CNNs), recurrent neural networks (RNNs)) and/or computer vision libraries (e.g., OpenCV, TensorFlow, PyTorch) for scene, object, and/or actor recognition. For example, the recommendation generator can identify user-preferred scene parameters (locations, settings, actors, genres, animated characters, sports, celebrities), channel logos, and playback session information (e.g., time of day, duration of playback sessions). These items can be utilized to dynamically generate personalized recommendations.

The recommendation generator can utilize additional, contextual information, such as user profile data, location data, network performance data, and so forth, to apply natural language processing (NLP) techniques for contextual data analysis. Contextual data can include channel preferences, channel restrictions, ad preferences, ad restrictions, program preferences, program restrictions, user interests, or other suitable parameters. In some implementations, contextual data can include user sentiment data, user interaction data, and/or voice data (e.g., user command to start playback, stop playback, rewind, fast forward, zoom in on a portion of the displayed scene, receive more information about a portion of the displayed scene), user sentiment data, and so forth. Such data can be collected, for example, using a voice assistant device, a smart phone, a smart remote, a gaming device, an entertainment device, or another suitable system or device. In some implementations, the platform can parse out an object called out by the user as indicated by the voice data (e.g., "where can I find this blue jacket?", "what's this character's name?") In some implementations, NLP and/or data mining techniques can identify patterns in contextual data, thereby refining recommendations.

In an example, a receiver device can receive a video stream comprising a set of frames, select at least one frame from the set of frames, and apply a computer vision model to the selected frame to extract object metadata for an object of interest. The object metadata can relate to at least one of a scene, person, character, channel identifier, or product identifier. Using the object metadata, the receiver device can execute a trained neural network to generate a set of recommended items. The trained neural network can be trained on program metadata, channel metadata, and/or scheduling metadata. The techniques can include generating and displaying an interactive program guide (IPG) that includes at least one item from the set of recommended items.

Distributed System(s) for Media Content Signaling

FIG. 1 illustrates an example of a distributed system for media content signaling, in accordance with one or more embodiments of the present technology. Example system 100 is a combination of components that interact to form an integrated whole for optimizing storage and/or streaming of media content. Components of the systems may be hardware components or software implemented on, and/or executed by, hardware components of the systems. For example, system 100 can include client devices 102, 104, and 106, local databases 110, 112, and 114, network(s) 108, and server devices 116, 118, and/or 120.

Client devices 102, 104, and 106 may be configured to support media content signaling, media selection, media playback, recording, and so forth. In one example, a client device 102 may be a mobile phone, a client device 104 may be a smart over-the-air (OTA) antenna, and a client device 106 may be a broadcast module box (e.g., television signal receiver, set-top box). In other example aspects, client device 106 may be a gateway device (e.g., router) that is in communication with sources, such as internet service providers (ISPs), cable networks, or satellite networks. Other possible client devices include but are not limited to smart phones, tablets, laptops, personal computers, televisions, augmented reality/virtual reality (AR/VR) devices, and other suitable devices capable of receiving and rendering (e.g., in video form, audio form) a digital signal.

In aspects, a client device, such as client devices 102, 104, and 106, may have access to a network from a gateway. In other aspects, client devices 102, 104, and 106, may be equipped to receive data (e.g., instructions from a server) from a gateway. The signals that client devices 102, 104, and 106 may receive may be transmitted from satellite broadcast tower 122. Broadcast tower 122 may also be configured to communicate with network(s) 108, in addition to being able to communicate directly with client devices 102, 104, and 106. In some examples, a client device may be a set-top box that is connected to a display device with input and/or output capabilities. Display devices can include a television (or a television that may have set-top box circuitry built into the television mainframe), a projection display, a monitor, a portable display device (smart phone, tablet, e-reader, smart watch), a specialized display device (digital signage device, scoreboards, jumbotron, virtual reality headset), an industrial display, a medical display, an automotive display, a gaming monitor, a touch screen kiosk, and so forth.

Client devices 102, 104, and 106 may be configured to run software (e.g., application 103) that allows a user to access the signal processing system described below, record media content, cause playback of media content, view media content, and/or receive media content recommendations. Client devices 102, 104, and 106 may access media content data through the networks. The data may be stored locally on the client device or served remotely via network(s) 108. For example, a client device may receive a signal from broadcast tower 122 containing content data. The signal may include or indicate the content data. The client device may receive the content data and subsequently store the data locally in databases 110, 112, and/or 114. In some use cases, the user-requested content data may be transmitted from a client device (e.g., client device 102, 104, and/or 106) via network(s) 108 to be stored remotely on server(s) 116, 118, and/or 120. A user may cause a client device to subsequently access the content data from a local database (110, 112, and/or 114) and/or external database (116, 118, and/or 120), depending on where the content data may be stored.

In some example implementations, client devices 102, 104, and/or 106 may be equipped to receive signals from an input device. Signals may be received on client devices 102, 104, and/or 106 via Bluetooth, Wi-Fi, infrared, light signals, binary, among other mediums and protocols for transmitting/receiving signals. For example, a user may use a mobile device 102 to check for the content data from a channel from an OTA antenna (e.g., antenna 104). A graphical user interface may display on the mobile device 102 the feature and/or notification data. Specifically, at a particular geolocation, the antenna 104 may receive signals from broadcast tower 122. The antenna 104 may then transmit those signals (e.g., for analysis or processing) via network(s) 108. The results of the analysis or processing may then be displayed on mobile device 102 via network(s) 108. In other examples, the results of the analysis or processing may be displayed on a television device connected to a broadcast module box, such as broadcast module box 106.

In some implementations, server(s) 116, 118, and/or 120 and/or client devices 102, 104, and/or 106 can be configured to support operations of the AI based recommendation generator as described further herein. For example, the servers and/or devices can include shared or dedicated processing circuitry to implement, at least in part, content signaling operations, such as operations described throughout this document. To that end, various circuits (modules) of the systems described here can include integrated circuits (e.g., application specific integrated circuits (ASICs)) that can include at least one set of neurons and at least one set of synaptic circuits that link the neurons in a neural network. The neurons can include, for example, memory units (e.g., registers), processors units (e.g., microprocessors) and/or input gates. The synaptic circuits can include memory units that can store synaptic weights. According to various implementations, any of the circuits described herein (e.g., artificial intelligence module 335, communications module 340, recommendation generator 345, configuration manager 350) can be implemented as ASICs or can include ASICs.

In some examples, databases stored on or accessible via remote servers 116, 118, and 120 may be utilized to assist the signal processing system in providing a user access to the AI based recommendation generator. Such databases may contain various contextual data data, such as content data, program data, object data, actor data, user behavior data, historical data, content type data, timing data, profile data, preference data, configuration data, storage device data, and/or model data. The data may be stored in native, vectorized, graph or another suitable format. The data may be retrievable via API function calls, queries, references to records and/or data elements, or through another suitable method of data retrieval. The data may be transmitted via network(s) 108 to client devices 102, 104, and/or 106 to assist in executing the AI based recommendation generator operations. Some examples of databases include databases, such as databases (715, 725A-C) described in connection with FIG. 7.

Because broadcast tower 122 and network(s) 108 are configured to communicate with one another, the systems and methods described herein may be able to perform the described operations using content, channel, program, object, actor and/or other data in various systems, such as streaming services, local and/or cloud storage, cable, satellite, or OTA.

Figure 2:
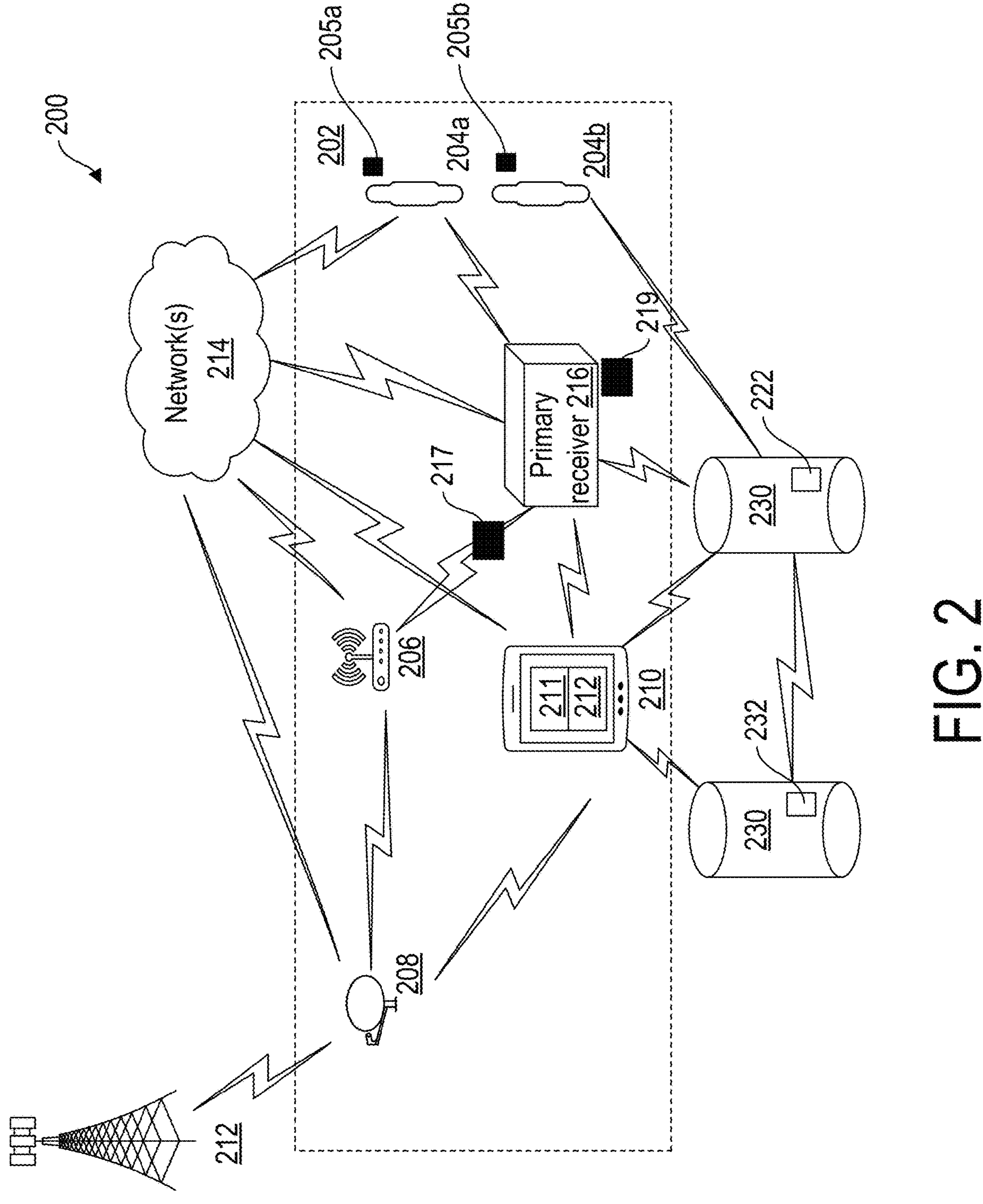
FIG. 2 illustrates an example environment of operation of a media content signaling system, in accordance with one or more implementations of the present technology.

FIG. 2 illustrates an example environment 200 of operation of a media content signaling system, in accordance with one or more implementations of the present technology. In the example environment 200, area 202 may represent a house, a commercial building or an area therein, an industrial building, an apartment, a condo, or any other type of suitable dwelling. Inside area 202 is at least one television (204*a*, 204*b*), an OTA box 206 (e.g., a television receiver box, a broadcast module box, a set-top box), an OTA antenna 208 (which, in some implementations, can be combined with a set-top box), and a mobile device 210. These devices may be wired or wirelessly configured to communicate with network(s) 214, via a suitable communication protocol or a combination thereof.

The OTA antenna 208 may be configured to receive local broadcast signals from local broadcast tower 212 or satellite broadcast tower. Accordingly, the OTA antenna 208 may route media content signals (e.g., broadcast signals) to the primary receiver 216 and/or television(s) (204*a*, 204*b*). The OTA antenna 208 may also receive, generate, and/or route various metadata for broadcast signals, which can provide information about audio and/or video streams. The broadcast signal metadata can include, for example, transport stream data, such as program associated tables, program map tables, time and date tables, network information tables, service description tables, event information tables, conditional access tables, application information tables, splice information tables, ad insertion markers, and so forth.

The primary receiver 216 (e.g., a device that can function as a satellite signal receiver and/or a DVR, NVR, and so forth) may be configured as a hub, gateway, or the like for receiving, transforming, and/or routing various forms of media content signals to user devices, such as television(s) (204 (*a*), 204 (*b*)) and/or mobile device(s) 210. To that end, the primary receiver 216 may receive satellite media content signals via network 214.

In some implementations, the primary receiver 216 may include an OTA adapter device 217, which may act as an additional tuner to a set of tuners of the primary receiver 216 to make broadcast signals accessible to user devices via the primary receiver 216. In some implementations, the primary receiver 216 can be configured to communicate, in a wired or wireless fashion, to one or more auxiliary receivers (205*a*, 205*b*) such that more than one user device (e.g., television(s) 204*a*, 204*b*) can receive content streams via the primary receiver 216. The content streams can be distinct content streams. To that end, user experience at a particular end device can be configured by electronic commands from the control server 220 using user/profile information. The information can include configuration information (user names, access URLs, passwords, access tokens, session timeout settings). The information can also include payment information.

As shown, the primary receiver 216 can send media content signals to one or more mobile devices 210. A particular mobile device 210 can have provided thereto (e.g., as an app, an executable, a plug-in, an applet, or via a browser) an application 211. The application 211 can be configured to receive, decode, and display media content signals (e.g., in the form of a recommendation).

In some implementations, a particular media content signal can include a consolidated signal stream of OTA broadcast signals, satellite signals, and/or streaming media signals from a service such as Netflix, Prime Video, etc. In such cases, the primary receiver 216 can include circuitry and/or device(s) (e.g., IPTV converter 222 to convert satellite signals) to generate digital (e.g., IP-based) media content signals suitable for transmission via IP-based networks to connected devices, such as a mobile device. In some implementations, such as when the IPTV converter 222 is bypassed or unavailable, the mobile device 210 can connect to the primary receiver 216 via a suitable wireless connection, such as Wi-Fi or Bluetooth, or via a wired connection, such as Ethernet or USB. In such instances, the application 211 can access and utilize, via the control server 220, connectivity settings (e.g., primary receiver 216 identifier, IP address, login information, user profile identifier) to connect to the primary receiver 216. In some implementations, such as when the primary receiver 216 is out-of-range in relation to the mobile device 210 (e.g., the mobile device 210 is not physically located in the area 202), the application 211 can enable a user to log in, via the control server 220, using a set of login credentials associated with a particular user profile identifier (e.g., rather than using a receiver or another device identifier to authenticate the user).

As shown, the mobile device 210 can receive from the content management server 230, directly or via the primary receiver 216, streaming video signals that serve video files 232 from streaming services, such as Netflix, Prime Video, etc. A particular streaming video signal can be consolidated, at or using the primary receiver 216 and/or the IPTV converter 219, with a media content signal transmitted or made available to a particular mobile device. For example, a determination can be made, in connection with authenticating user profile and/or receiver based login credentials, or a combination thereof that a user profile indicates the user also has a streaming media account, which can be accessed by the control server 220 and/or primary receiver 216 to retrieve streaming video content.

Accordingly, the application 211 receives a unified streaming content media signal, which can be generated using multiple signals or generated solely using the primary receiver 216. The signal can include video content encoded according to a suitable video codec, such as H.264, H.265, VP9, and/or AV1. The video content can be transmitted according to a suitable streaming technique, such as an adaptive streaming technique to account for variability in bandwidth of transmission media to mobile device 210. Examples of suitable streaming techniques include Dynamic Adaptive Streaming over HTTP (DASH), HTTP Live Streaming (HLS), and/or Smooth. When a streaming technique is used, the media content can be partitioned into packages and delivered to the mobile device 210 using via a series of HTTP messages. A particular package can include segment metadata (timing, URL, resolution, bit rate) and contain media content data (payload) in suitable format, such as ISO (e.g., MP4), MPEG-2 Transport Stream, or another format.

AI Based Recommendation Generator for Media Content Signaling Systems

Figure 3:
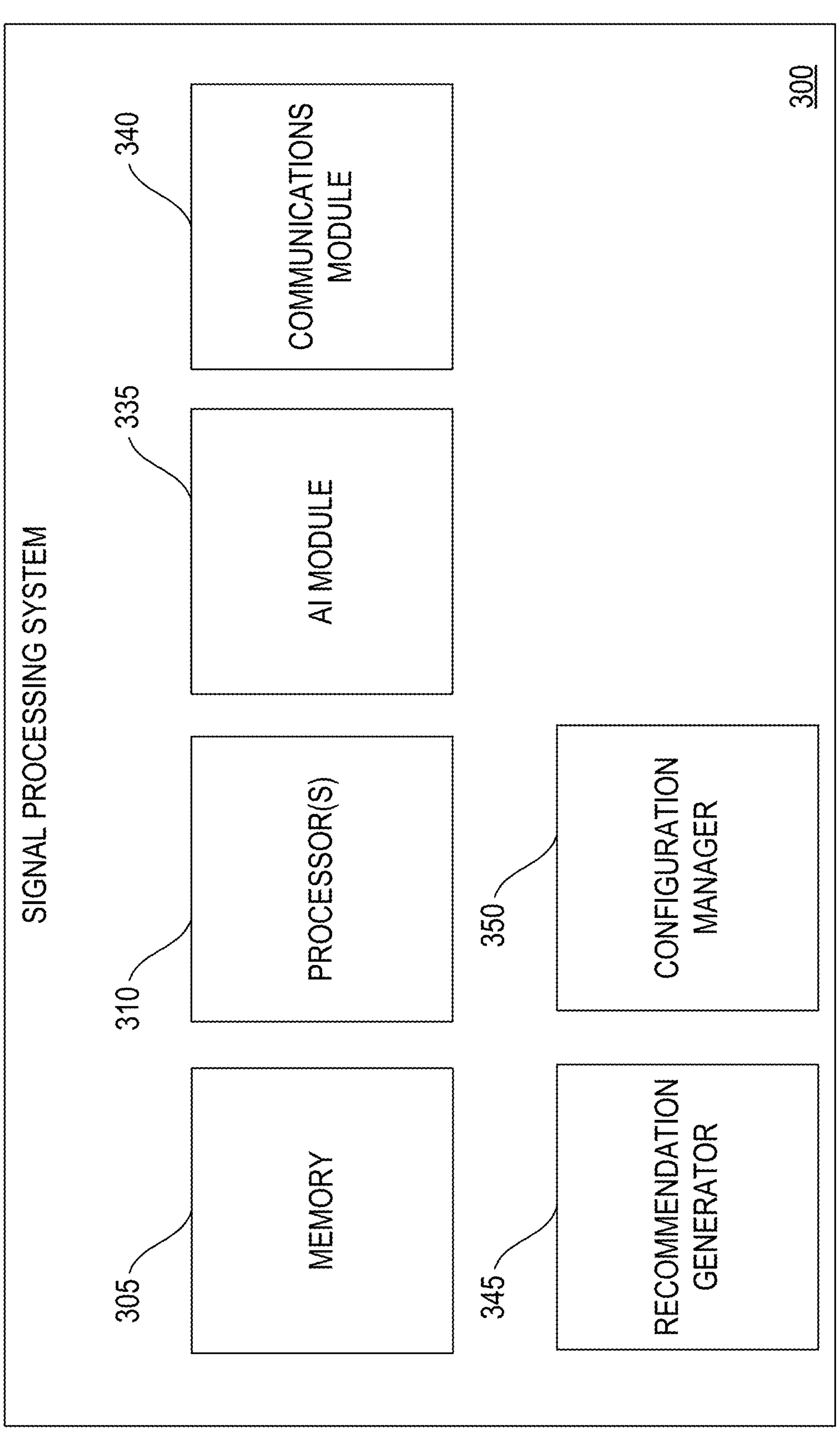
FIG. 3 illustrates an example signal processing system for implementing an artificial intelligence (AI) based recommendation generator for media content signaling systems, in accordance with one or more implementations of the present technology.

FIG. 3 illustrates an example signal processing system 300 for implementing an AI based recommendation generator for media content signaling systems, in accordance with one or more implementations of the present technology. The signal processing system 300 (e.g., one or more data processors) is capable of executing algorithms, software routines, and/or instructions based on processing data provided by a variety of sources related to optimizing storage of recorded media content. The signal processing system can be a general-purpose computer or a dedicated, special-purpose computer or an arrangement thereof.

According to the implementations shown in FIG. 3, the disclosed system can include memory 305, one or more processors 310, artificial intelligence module 335, communications module 340, recommendation generator 345, and/or configuration manager 350. Together, these modules can implement the AI based recommendation generator. Various implementations of the present technology may include some, all, or none of these modules and components, along with other modules, applications, data, and/or components. Some implementations may incorporate two or more of these modules and components into a single module and/or associate a portion of the functionality of one or more of these modules with a different module.

Operations of the signal processing system 300 can be performed by a server, a user device, or a combination thereof. To that end, the described operations or subsets thereof can be performed or caused to be performed by receivers, DVRs, NVRs, set-top boxes, OTA antennas, OTA antenna adapters, other client devices (e.g., smart phones, tablets, gaming devices, display devices) described throughout this document. In some implementations, at least a subset of the operations can be edge operations performed locally in relation to data origin or in relation to client devices. For example, interception, extraction and/or processing of frames from content streams can be performed locally at a particular receiver, set-top box, OTA device, display, or user device. To that end, the device can include physical and/or virtual memory 305, processor 310, and/or communications module 340 to facilitate the described operations.

Memory 305 can store instructions for running one or more applications or modules on processor(s) 310. For example, memory 305 could be used in one or more embodiments to house all or some of the instructions needed to execute the functionality of artificial intelligence module 335, communications module 340, recommendation generator 345, and/or configuration manager 350. Generally, memory 305 can include any device, mechanism, or populated data structure used for storing information. In accordance with some embodiments of the present disclosures, memory 305 can encompass, but is not limited to, any type of volatile memory, nonvolatile memory, and dynamic memory. For example, memory 305 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 305 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 305. In some example aspects, memory 305 may store at least one database associated with the signal processing system 300.

The artificial intelligence module 335 may be configured to perform computer vision operations, detect objects, and/or perform classification operation. An example AI stack is described in more detail connection with FIG. 4. The artificial intelligence module 335 can include one or more sequential models, which can be successively applied. For example, a computer vision model can extract an object from a particular frame, and generate an output set that can include an object identifier, object description, object reference location (frame, coordinates, timestamp in a video stream) and so forth. Additional programming logic can be executed to determine display durations, user preferences, and generate other synthetic values. The logic can further generate a set of items (e.g., channels, movies, genres, and so forth) that correspond to the detected object. In some implementations, a set of detected objects can be scored to generate a confidence value that can relate to the relative importance of the object in generating a recommendation, a likelihood of the object being reflective of user preferences, and so forth. The output and/or synthetic values can be provided to a downstream model (e.g., a neural network, an LLM, and so forth), which can classify the data to generate a set of items to be included in a recommendation.

Client devices (e.g., personal computers, smart phones, tablets, etc.) may be equipped to access artificial intelligence algorithms of the AI module 335. To that end, a trained model may be deployed to one or more devices. As a specific example, an instance of a trained ML model may be deployed to a server device and/or a client device. The model deployed to a server device may be configured to be used by the client device when, for example, the client device is connected to the internet. Conversely, the model deployed to a client device may be configured to be used by the client device when, for example, the client device is not connected to the internet. In some instances, a client device may not be connected to the internet but still configured to receive satellite signals with connectivity information. In such examples, the ML model may be locally cached by the client device.

The aforementioned operations can be managed by the communications module 340, which can also transmit or route information, in the form of electronic signals, among various devices shown, for example, in FIGS. 1 and 2, such as one or more client devices, databases, routers, receivers (primary receivers, auxiliary receivers), OTA set-top boxes, controller devices, control servers, content delivery servers, streaming devices, streaming media servers, etc. The communications can employ any suitable type of technology, such as Bluetooth, WiFi, WiMax, Ethernet, cellular, single hop communication, multi-hop communication, Dedicated Short Range Communications (DSRC), or a proprietary communication protocol.

The recommendation generator 345 can utilize model outputs and/or supplemental contextual data to generate recommendations in the form of graphical user interfaces that can include navigable items. In some implementations, a particular model can be trained and/or given examples using a one-shot or few-shot technique to generate the output in a format that is consistent with metadata retrievable by the recommendation generator 345. Examples include TV-Anytime, EPG-compliant formats (XML, JSON), ATSC PSIP, and other suitable formats. In some implementations, the recommendation generator 345 can include or cause to be executed programming logic that can use the extracted output (e.g., channel logo, object identifiers) to access channel metadata (e.g., channel name, number, type, broadcast language) and apply a neural network to generate recommendations for similar channels, retrieve a set of similar channels from a data store, and so forth. In some implementations, the recommendation generator 345 can use the model output to access program metadata (title, description, genre, episode number, season number, air date, rating, duration) and include the relevant information in a recommendation. In some implementations, the recommendation generator 345 can use the model output to access additional metadata (schedule, cast and crew, tags, image metadata, closed captions) to generate the recommendations.

The configuration manager 350 can store and manage playback session information, configuration information, access information for third-party applications and so forth. In some implementations, configuration manager 350 can store and manage information and executable code for setting and applying frame processing parameters. For example, every Nth frame can be intercepted and provided to a computer vision model for analysis. The value N can be generated using a random number generator for random frame sampling or can be a pre-programmed value for uniform frame sampling. For example, frames can be divided into blocks and/or pixels, and histogram-based comparisons or other pattern recognition techniques can be applied to detect scene changes and cause the corresponding frames to be extracted and provided for analysis to the computer vision model. Other techniques to determine frames to be analyzed using computer vision can include optical flow analysis (tracking pixel motion to detect scene changes), use of audio cues, shot boundary detection, motion-based frame selection, feature-based frame selection and so forth.

Figure 4:
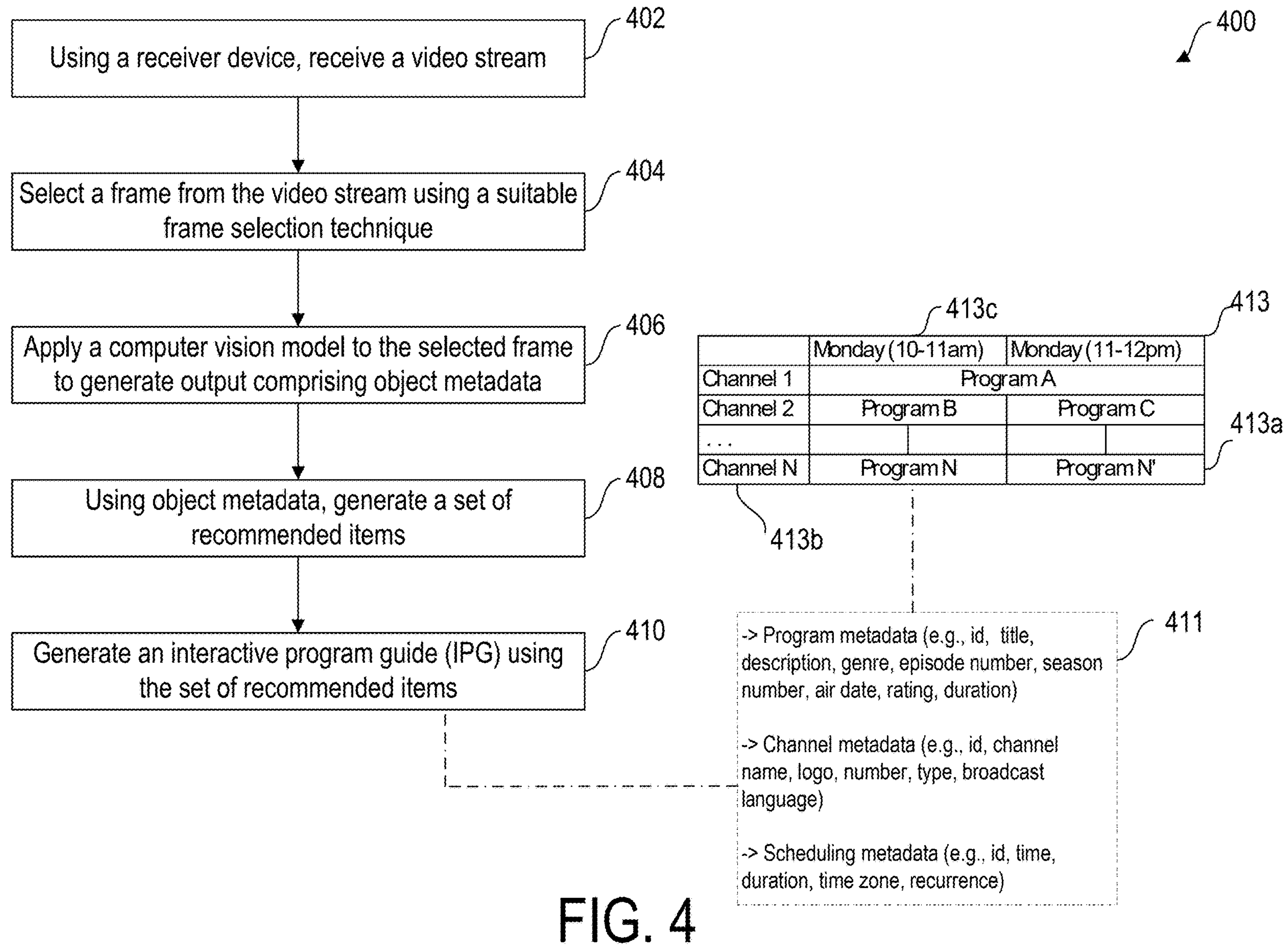
FIG. 4 is a flow diagram illustrating an example method of operation of the AI based recommendation generator for media content signaling systems, in accordance with one or more embodiments of the present technology.

Example Methods of Operation of the AI Based Recommendation Generator for Media Content Signaling Systems FIG. 4 is a flow diagram illustrating an example method of operation 400 of the AI based recommendation generator for media content signaling systems, in accordance with one or more embodiments of the present technology. In some implementations, operations 400 can be triggered by detecting, at a receiver device, an active playback session. The playback session can include streaming third-party media, such as, for example, content provided by a streaming service, gaming application, and so forth.

At 402, a receiver device communicatively coupled to a content source and a display device, can receive, from the content source, a video stream including a set of frames. In some implementations, the video stream is an internet protocol (IP) media stream, and the receiver device is capable of receiving one or more of satellite television signals, broadcast television signals, a cable television signals.

At 404, operations can include selecting at least one frame from the set of frames. In some implementations, selecting the at least one frame from the set of frames is performed according to a frame selection technique, the frame selection technique including one or more of keyframe extraction based on scene changes, frame sampling at predetermined intervals, or random frame sampling.

At 406, operations can include applying a computer vision model to the selected frame to extract or generate object metadata for an object of interest. The object metadata can relate to at least one of a scene, person, character, channel identifier, or product identifier. In some implementations, computer vision can be applied through a multistage process. First, image preprocessing can enhance quality, resize, and normalize pixel values in the selected frame. Next, suitable object detection algorithms (e.g., YOLO, SSD) can identify regions of interest. Next, feature extraction can describe objects using visual descriptors (e.g., shape, color, texture), and these descriptors can be utilized by the trained computer vision model to determine a corresponding scene, person, character, channel identifier, or product identifier.

At 408, operations can include using object metadata to generate an input feature for a trained neural network, which can generate a set of recommended items. The trained neural network can trained on program metadata, channel metadata, and/or scheduling metadata. The neural network can use the object metadata to perform object classification, the object classification relating to at least one of the program metadata, channel metadata, or scheduling metadata. In some aspects, the operations can further include validating the object metadata by matching metadata against a database of known objects. In some aspects, operations can include accessing contextual data relating to the playback session and causing the trained neural network to use the object metadata and the contextual data to generate the set of recommended items. For example, the trained neural network can be further trained on clustered, anonymized user preference data, ad preference data, program preference data, channel preference data and so forth. In some implementations, the preference data can include historical playback data.

At 410, operations can include generating and causing the display device to display an IPG that includes at least one item from the set of recommended items. An example recommended item 411 can include program, channel, and/or schedule identifiers and metadata that can be utilized to generate displayable and/or navigable items, such as the IPG 413. For example, the at least one item can include a recommended program identifier and/or a recommended channel identifier. In some implementations, the IPG 413 is generated, at least in part, during a particular playback session associated with the video stream. In some implementations, the IPG 413 relates to a content item delivered (e.g., to the receiver device) through one or more of a particular satellite television signal, broadcast television signal, or cable television signal. In an example, the IPG 413 can include program information **413*a*, channel information 413*b*, and/or schedule information 413*c***, which can be based on the recommended items/metadata.

In some aspects, the operations can include transmitting the set of recommended items to a computing system associated with a search or analytics engine, a personal video recorder, or a broadcast automation system.

Example AI Compute Stack

Figure 5:
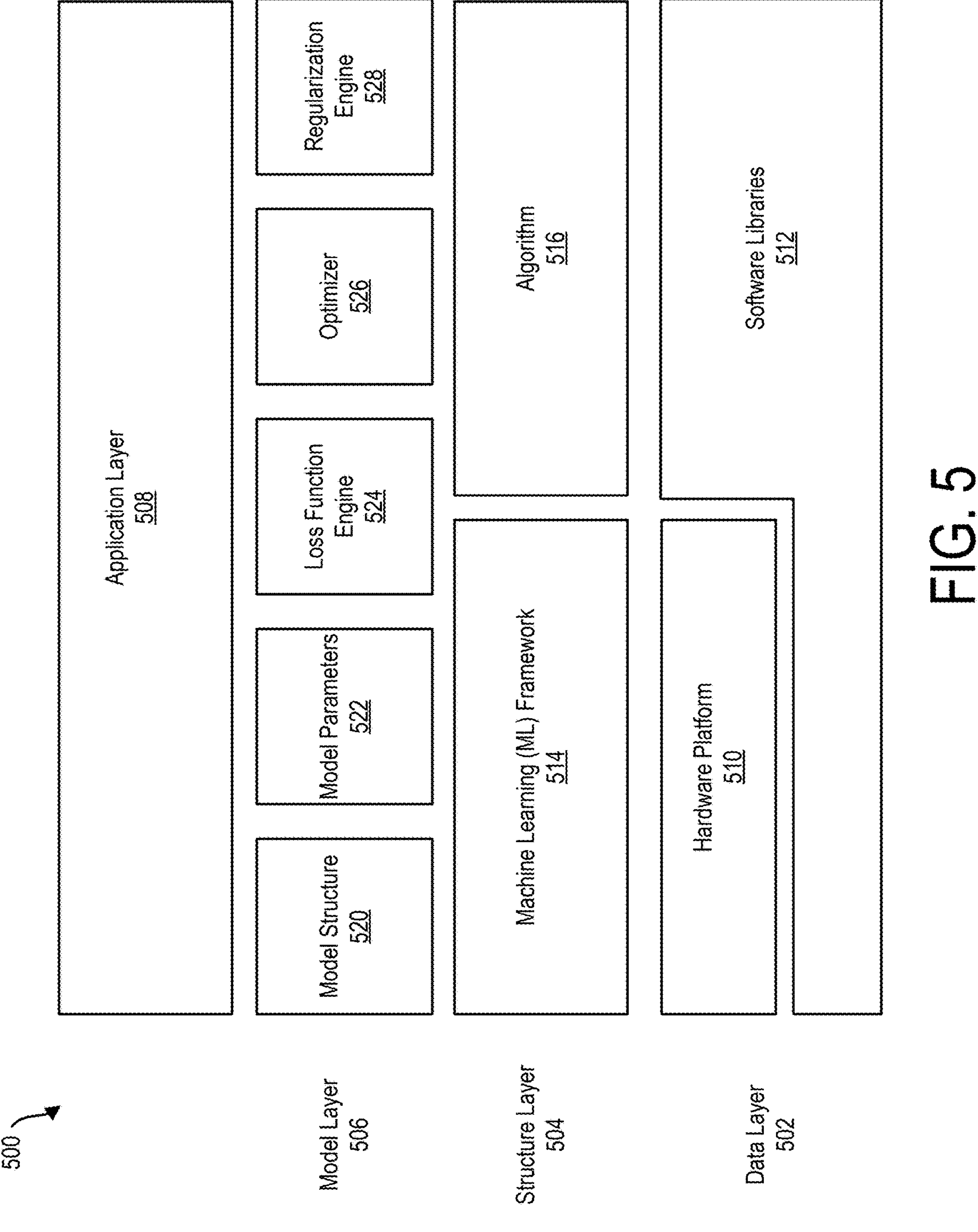
FIG. 5 illustrates an example AI compute stack, according to one or more implementations of the present technology.

FIG. 5 illustrates a layered architecture of an AI system 500 that can implement the ML models of the signal processing system, in accordance with some implementations of the present technology. For example, any of the compute modules described in connection with FIGS. 1-3 can include or can cause execution of one or more components of the AI system 500.

As shown, the AI system 500 can include a set of layers, which conceptually organize elements within an example network topology for the AI system's architecture to implement a particular AI model. Generally, an AI model is a computer-executable program implemented by the AI system 500 that analyses data to make predictions. Information can pass through each layer of the AI system 500 to generate outputs for the AI model. The layers can include a data layer 502, a structure layer 504, a model layer 506, and an application layer 508. The algorithm 516 of the structure layer 504 and the model structure 520 and model parameters 522 of the model layer 506 together form an example AI model. The optimizer 526, loss function engine 524, and regularization engine 528 work to refine and optimize the AI model, and the data layer 502 provides resources and support for application of the AI model by the application layer 508.

The data layer 502 acts as the foundation of the AI system 500 by preparing data for the AI model. As shown, the data layer 502 can include two sub-layers: a hardware platform 510 and one or more software libraries 512. The hardware platform 510 can be designed to perform operations for the AI model and include computing resources for storage, memory, logic and networking. The hardware platform 510 can process amounts of data using one or more servers. The servers can perform backend operations such as matrix calculations, parallel calculations, machine learning (ML) training, and the like. Examples of servers used by the hardware platform 510 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors, such as application specific integrated circuits (ASIC). GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 510 can include computing resources, (e.g., servers, memory, etc.) offered by a cloud services provider. The hardware platform 510 can also include computer memory for storing data about the AI model, application of the AI model, and training data for the AI model. The computer memory can be a form of random-access memory (RAM), such as dynamic RAM, static RAM, and non-volatile RAM.

The software libraries 512 can be thought of as suites of data and programming code, including executables, used to control the computing resources of the hardware platform 510. The programming code can include low-level primitives (e.g., fundamental language elements) that form the foundation of one or more low-level programming languages, such that servers of the hardware platform 510 can use the low-level primitives to carry out specific operations. The low-level programming languages do not require much, if any, abstraction from a computing resource's instruction set architecture, allowing them to run quickly with a small memory footprint. Examples of software libraries 512 that can be included in the AI system 500 include INTEL Math Kernel Library, NVIDIA cuDNN, EIGEN, and OpenBLAS.

The structure layer 504 can include an ML framework 514 and an algorithm 516. The ML framework 514 can be thought of as an interface, library, or tool that allows users to build and deploy a particular AI model or models. The ML framework 514 can include an open-source library, an application programming interface (API), a gradient-boosting library, an ensemble method, and/or a deep learning toolkit that work with the layers of the AI system 500 to facilitate development of the AI model. For example, the ML framework 514 can distribute processes for application or training of the AI model across multiple resources in the hardware platform 510. The ML framework 514 can also include a set of components that have the functionality to implement and train a particular AI model and allow users to use pre-built functions and classes to construct and train the AI model. Thus, the ML framework 514 can be used to facilitate data engineering, development, hyperparameter tuning, testing, and training for the AI model. Examples of ML frameworks 514 that can be used in the AI system 500 include Hugging Face Transformers, Stanford CoreNLP, SPACY, TENSORFLOW, PYTORCH, SCIKIT-LEARN, KERAS, LightGBM, RANDOM FOREST, and AMAZON WEB SERVICES, OpenNLP, and GENSIM. In some implementations, more than one framework 514 can be utilized to train and/or invoke specific algorithms 516. For example, any of the AI module 335, recommendation generator 345, or configuration manager 350 can train and/or invoke one or more of a particular algorithm 516 (e.g., two distinct algorithms, such as a computer vision model and a classification neural network).

A particular algorithm 516 can be an organized set of computer-executable operations used to generate output data from a set of input data and can be described using pseudocode. The algorithm 516 can include complex code that allows the computing resources to learn from new input data and create new/modified outputs based on what was learned. In some implementations, the algorithm 516 can build the AI model through being trained while running computing resources of the hardware platform 510. This training allows the algorithm 516 to make predictions or decisions without being explicitly programmed to do so. Once trained, the algorithm 516 can run at the computing resources as part of the AI model to make predictions or decisions, improve computing resource performance, or perform tasks. The algorithm 516 can be trained using supervised learning, unsupervised learning, semi-supervised learning, and/or reinforcement learning. In some implementations, different training techniques can be utilized to train different algorithms 516.

For example, using supervised learning, the algorithm 516 can be trained to learn patterns (e.g., map input data to output data) based on labeled training data. The training data may be labeled by an external user or operator. For instance, a user may collect a set of training data, such as by generating, importing, compiling, or entering entity data, ontology data, or domain-specific data. Furthermore, training data can include structured data generated by various engines of the the signal processing system.

In some implementations, the user may label the training data based on one or more classes and trains the AI model by inputting the training data to the algorithm 516. In various implementations, the structured data can include labels in the form of attribute identifiers, metadata, keys in key-value pairs, or any other suitable form.

The algorithm determines how to label the new data based on the labeled training data. The user can facilitate collection, labeling, and/or input via the ML framework 514. In some instances, the user may convert the training data to a set of feature vectors for input to the algorithm 516. Once trained, the user can test the algorithm 516 on new data to determine if the algorithm 516 is predicting accurate labels for the new data. For example, the user can use cross-validation methods to test the accuracy of the algorithm 516 and retrain the algorithm 516 on new training data if the results of the cross-validation are below an accuracy threshold.

Supervised learning can involve classification and/or regression. Classification techniques involve teaching the algorithm 516 to identify a category of new observations based on training data and are used when input data for the algorithm 516 is discrete. Said differently, when learning through classification techniques, the algorithm 516 receives training data labeled with categories (e.g., classes) and determines how features observed in the training data relate to the categories. Once trained, the algorithm 516 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 516 is continuous. Regression techniques can be used to train the algorithm 516 to predict or forecast relationships between variables. To train the algorithm 516 using regression techniques, a user can select a regression method for estimating the parameters of the model. The user collects and labels training data that is input to the algorithm 516 such that the algorithm 516 is trained to understand the relationship between data features and the dependent variable(s). Once trained, the algorithm 516 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 516 learns patterns from unlabeled training data. In particular, the algorithm 516 is trained to learn hidden patterns and insights of input data, which can be used for data exploration or for generating new data. Here, the algorithm 516 does not have a predefined output, unlike the labels output when the algorithm 516 is trained using supervised learning. Said another way, unsupervised learning is used to train the algorithm 516 to find an underlying structure of a set of data, group the data according to similarities, and represent that set of data in a compressed format.

A few techniques can be used to facilitate model learning: clustering, anomaly detection, and techniques for learning latent variable models. Clustering techniques involve grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 516 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 516 may be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that may be used by the algorithm 516 include factor analysis, item response theory, latent profile analysis, and latent class analysis.

The model layer 506 implements the AI model using data from the data layer and the algorithm 516 and ML framework 514 from the structure layer 504, thus enabling decision-making capabilities of the AI system 500. The model layer 506 includes a model structure 520, model parameters 522, a loss function engine 524, an optimizer 526, and a regularization engine 528.

The model structure 520 describes the architecture of the AI model of the AI system 500. The model structure 520 defines the complexity of the pattern/relationship that the AI model expresses. Examples of structures that can be used as the model structure 520 include decision trees, support vector machines, regression analyses, Bayesian networks, Gaussian processes, genetic algorithms, and artificial neural networks (or, simply, neural networks). The model structure 520 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 520 may include one or more hidden layers of nodes between the input and output layers. The model structure 520 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 522 represent the relationships learned during training and can be used to make predictions and decisions based on input data. The model parameters 522 can weight and bias the nodes and connections of the model structure 520. For instance, when the model structure 520 is a neural network, the model parameters 522 can weight and bias the nodes in each layer of the neural networks, such that the weights determine the strength of the nodes and the biases determine the thresholds for the activation functions of each node. The model parameters 522, in conjunction with the activation functions of the nodes, determine how input data is transformed into desired outputs. The model parameters 522 can be determined and/or altered during training of the algorithm 516.

The loss function engine 524 can determine a loss function, which is a metric used to evaluate the AI model's performance during training. For instance, the loss function engine 524 can measure the difference between a predicted output of the AI model and the actual output of the AI model and is used to guide optimization of the AI model during training to minimize the loss function. The loss function may be presented via the ML framework 514, such that a user can determine whether to retrain or otherwise alter the algorithm 516 if the loss function is over a threshold. In some instances, the algorithm 516 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 526 adjusts the model parameters 522 to minimize the loss function during training of the algorithm 516. In other words, the optimizer 526 uses the loss function generated by the loss function engine 524 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 526 used may be determined based on the type of model structure 520 and the size of data and the computing resources available in the data layer 502.

The regularization engine 528 executes regularization operations. Regularization is a technique that prevents over- and under-fitting of the AI model. Overfitting occurs when the algorithm 516 is overly complex and too adapted to the training data, which can result in poor performance of the AI model. Underfitting occurs when the algorithm 516 is unable to recognize even basic patterns from the training data such that it cannot perform well on training data or on validation data. The optimizer 526 can apply one or more regularization techniques to fit the algorithm 516 to the training data properly, which helps constraint the resulting AI model and improves its ability for generalized application. Examples of regularization techniques include lasso (L1) regularization, ridge (L2) regularization, and elastic (L1 and L2 regularization).

The application layer 508 describes how the AI system 500 is used to solve problem or perform tasks. In an example implementation, the application layer 508 can include any of the application 111 of FIG. 1. Application 111 can generate and provide recommendations and enable users to navigate to and interact with content.

Example Computing Device

Figure 6:
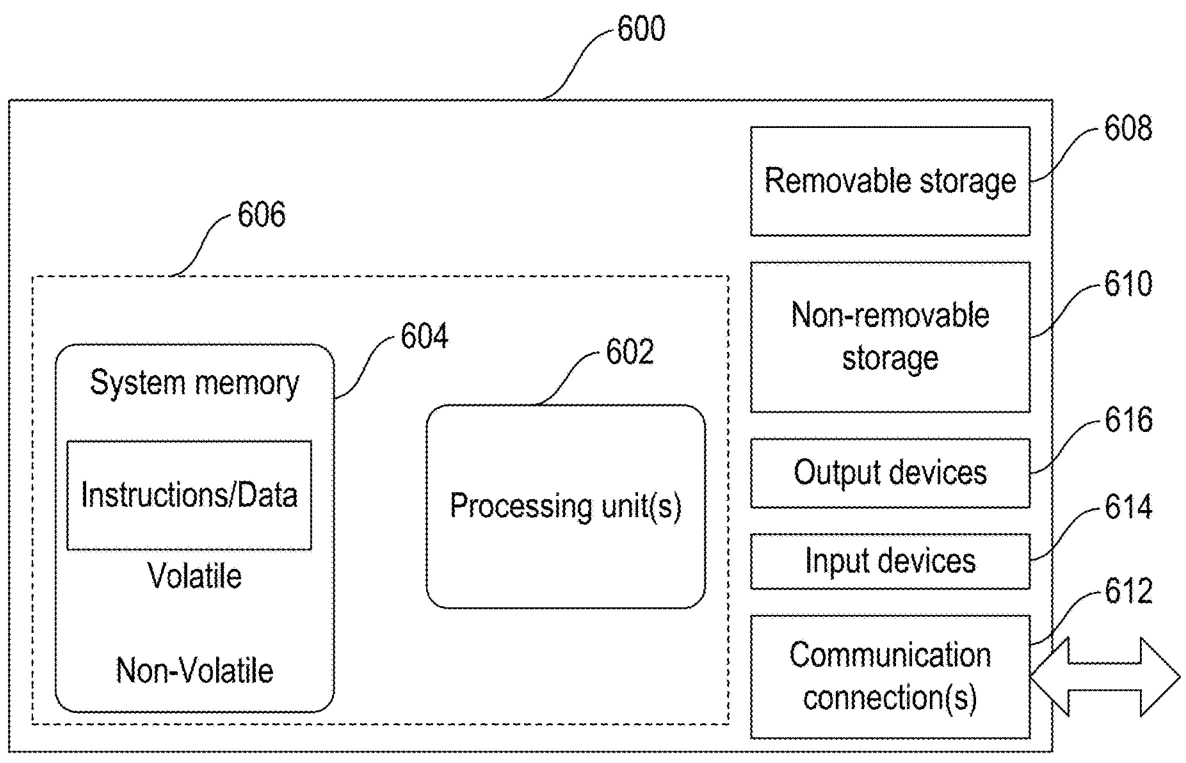
FIG. 6 is a component diagram illustrating compute units of an example computing device in an example media content signaling system, in accordance with one or more embodiments of the present technology.

FIG. 6 is a component diagram illustrating compute units of an example computing device 600 in an example media content signaling system, in accordance with one or more embodiments of the present technology. This is only one example of a suitable computing device and is not intended to suggest any limitation as to the scope of use or functionality. Other computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like. In some implementations, components of the computing device 600 are distributed across systems and/or geographical locations.

In its most basic configuration, computing device 600 typically includes at least one processing unit 602 and memory 604. Depending on the exact configuration and type of computing device, memory 604 (storing, among other things, information related to detected devices, compression artifacts, association information, personal gateway settings, and instruction to perform the methods disclosed herein) may be volatile (such as RAM), non-volatile (such as ROM, flash memory, etc.), or some combination of the two. This most basic configuration is illustrated in FIG. 6 by dashed line 606. Further, computing device 600 may also include storage devices (removable 608 and/or non-removable 610) including, but not limited to, magnetic or optical disks or tape. Similarly, computing device 600 may also have input device(s) 614 such as keyboard, mouse, pen, voice input, etc., and/or output device(s) 616 such as a display, speakers, printer, etc. Also included in the environment may be one or more communication connections, 612, such as Bluetooth, WiFi, WiMax, LAN, WAN, point to point, etc.

Operating device 600 typically includes at least some form of computer readable media. Computer readable media can be any available media that can be accessed by processing unit 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM EEPROM, flash memory or other memory technology, CD-ROM, digital versatile disks (DVD) or other optical storage, magnetic cassettes, magnetic tape, magnetic disk storage, or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulate data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The computing device 600 may be a single computer (e.g., mobile computer) operating in a networked environment using logical connections to one or more remote computers. The remote computer may be a personal computer, a server, a router, a network PC, a peer device, an OTA antenna, a set-top box, or other common network node, and typically includes many or all of the elements described above as well as others not so mentioned. The logical connections may include any method supported by available communications media. Such networking environments are commonplace in offices, enterprise-wide computer networks, intranets, and the Internet.

Example Networked Computing Environment

Figure 7:
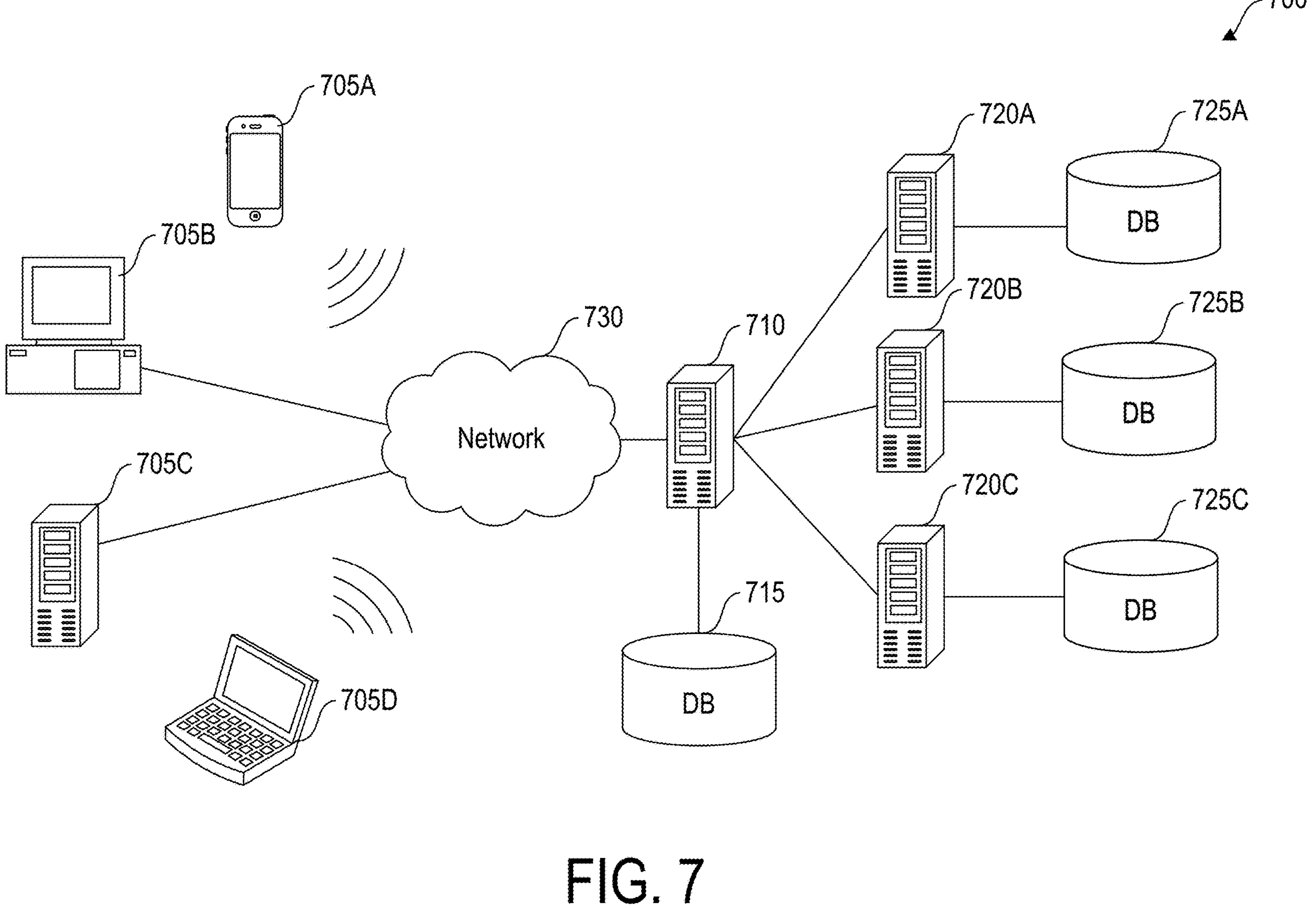
FIG. 7 is a component diagram illustrating a networked arrangement of computing devices in an example media content signaling system, in accordance with one or more embodiments of the present technology.

FIG. 7 is a component diagram illustrating a networked arrangement of computing devices in an example media content signaling system, in accordance with one or more embodiments of the present technology. In some implementations, environment 700 includes one or more client computing devices 705A-D, examples of which can host the signal processing system 300. Client computing devices 705 operate in a networked environment using logical connections through network 730 to one or more remote computers, such as a server computing device.

In some implementations, server 710 is an edge server which receives client requests and coordinates fulfillment of those requests through other servers, such as servers 720A-C. In some implementations, server 710 can include a load balancer that distributes requests among a set of servers. In some implementations, server computing devices 710 and 720 comprise computing systems, such as the signal processing system 300. For example, a particular server 710 can include an ASIC configured to perform a particular AI operation (e.g., neural network processing, application of computer vision techniques for scene detection, object recognition, and/or actor recognition, user behavior and preference analytics, visual similarity-based recommendations, and so forth). Although each server computing device 710 and 720 is displayed logically as a single server, server computing devices can each be a distributed computing environment encompassing multiple computing devices located at the same or at geographically disparate physical locations. In some implementations, each server 720 corresponds to a group of servers.

Client computing devices 705 and server computing devices 710 and 720 can each act as a server or client to other server or client devices. In some implementations, servers (710, 720A-C) connect to a corresponding database (715, 725A-C). As discussed above, each server 720 can correspond to a group of servers, and each of these servers can share a database or can have its own database.

Databases 715 and 725 warehouse (e.g., store) information such as training data, ontologies, entity data (e.g., entity, type), domain-specific data, configuration data, model data, weights, vectorized representations of data, graph representations of data, rules and/or logic for detecting similarities, content viewing session management data, and so forth. Although databases 715 and 725 are displayed logically as single units, databases 715 and 725 can each be a distributed computing environment encompassing multiple computing devices, can be located within their corresponding server, or can be located at the same or at geographically disparate physical locations.

Network 730 can be a local area network (LAN) or a wide area network (WAN), but can also be other wired or wireless networks. In some implementations, network 730 is the Internet or some other public or private network. Client computing devices 705 are connected to network 730 through a network interface, such as by wired or wireless communication. While the connections between server 710 and servers 720 are shown as separate connections, these connections can be any kind of local, wide area, wired, or wireless network, including network 730 or a separate public or private network.

CONCLUSION

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and the alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims. Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

What is claimed is:

1. A method for dynamically processing visual content to generate content recommendations, the method comprising:

with a receiver device communicatively coupled to a content source and a display device, receiving, from the content source, a video stream comprising a set of frames;

selecting at least one frame from the set of frames;

applying a computer vision model to the selected frame to extract object metadata for an object of interest, wherein the object metadata relates to at least one of a scene, person, character, channel identifier, or product identifier;

using the object metadata, generating a set of recommended items by:

validating the object metadata against a database of known data;

using the validated object metadata, generating an input feature set for a trained neural network; and applying the trained neural network to generate a set of recommended items, wherein the trained neural network is trained to generate recommended items by classifying (i) channel metadata and (ii) either program metadata, scheduling metadata, or both; and generating and causing the display device to display an interactive program guide (IPG) that includes at least one item from the set of recommended items, the at least one item comprising at least one of a recommended program identifier and a recommended channel identifier;

wherein the IPG is generated, at least in part, during a particular playback session associated with the video stream.

2. The method of claim 1, wherein the video stream is an internet protocol (IP) media stream; wherein the receiver device is capable of receiving one or more of satellite television signals, broadcast television signals, a cable television signals; and wherein the IPG relates to a content item delivered through one or more of a particular satellite television signal, broadcast television signal, or cable television signal.

3. The method of claim 1, wherein selecting the at least one frame from the set of frames is performed according to a frame selection technique, the frame selection technique comprising one or more of keyframe extraction based on scene changes, frame sampling at predetermined intervals, or random frame sampling.

4. The method of claim 1, further comprising using the validated object metadata to perform object classification by the trained neural network, the object classification relating to at least one of the program metadata, channel metadata, and scheduling metadata.

5. The method of claim 1, further comprising:

matching the object metadata against a database of known objects.

6. The method of claim 1, further comprising:

accessing contextual data relating to the playback session, the contextual data comprising user audio input received via an input device connected to the receiver device; and causing the trained neural network to use the validated object metadata and the contextual data to generate the set of recommended items.

7. The method of claim 1, further comprising:

transmitting the set of recommended items to a computing system associated with at least one of a personal video recorder or a broadcast automation system.

8. One or more computer-readable media having instructions stored thereon that, when executed by at least one processor, cause a computing system to perform operations for dynamically processing visual content to generate content recommendations, the operations comprising:

with a receiver device communicatively coupled to a content source and a display device, receiving, from the content source, a video stream comprising a set of frames;

selecting at least one frame from the set of frames;

applying a computer vision model to the selected frame to extract object metadata for an object of interest, wherein the object metadata relates to at least one of a scene, person, character, channel identifier, or product identifier;

using the object metadata, generating a set of recommended items by:

validating the object metadata against a database of known data;

using the validated object metadata, generating an input feature set for a trained neural network; and applying the trained neural network to generate a set of recommended items, wherein the trained neural network is trained to generate recommended items by classifying (i) channel metadata and (ii) either program metadata, scheduling metadata, or both; and generating and causing the display device to display an interactive program guide (IPG) that includes at least one item from the set of recommended items, the at least one item comprising at least one of a recommended program identifier and a recommended channel identifier;

wherein the IPG is generated, at least in part, during a particular playback session associated with the video stream.

9. The media of claim 8, wherein the video stream is an internet protocol (IP) media stream; wherein the receiver device is capable of receiving one or more of satellite television signals, broadcast television signals, a cable television signals; and wherein the IPG relates to a content item delivered through one or more of a particular satellite television signal, broadcast television signal, or cable television signal.

10. The media of claim 8, wherein selecting the at least one frame from the set of frames is performed according to a frame selection technique, the frame selection technique comprising one or more of keyframe extraction based on scene changes, frame sampling at predetermined intervals, or random frame sampling.

11. The media of claim 8, the instructions further comprising using the validated object metadata to perform object classification by the trained neural network, the object classification relating to at least one of the program metadata, channel metadata, and scheduling metadata.

12. The media of claim 8, the instructions further comprising:

matching the object metadata against a database of known objects.

13. The media of claim 8, the instructions further comprising:

accessing contextual data relating to the playback session, the contextual data comprising user audio input received via an input device connected to the receiver device; and causing the trained neural network to use the validated object metadata and the contextual data to generate the set of recommended items.

14. The media of claim 8, the instructions further comprising:

transmitting the set of recommended items to a computing system associated with at least one of a personal video recorder or a broadcast automation system.

15. A computing system configured to perform operations for dynamically processing visual content to generate content recommendations, the operations comprising:

with a receiver device communicatively coupled to a content source and a display device, receiving, from the content source, a video stream comprising a set of frames;

selecting at least one frame from the set of frames;

applying a computer vision model to the selected frame to extract object metadata for an object of interest, wherein the object metadata relates to at least one of a scene, person, character, channel identifier, or product identifier;

using the object metadata, generating a set of recommended items by:

validating the object metadata against a database of known data;

using the validated object metadata, generating an input feature set for a trained neural network; and applying the trained neural network to generate a set of recommended items, wherein the trained neural network is trained to generate recommended items by classifying (i) channel metadata and (ii) either program metadata, scheduling metadata, or both; and generating and causing the display device to display an interactive program guide (IPG) that includes at least one item from the set of recommended items, the at least one item comprising at least one of a recommended program identifier and a recommended channel identifier;

wherein the IPG is generated, at least in part, during a particular playback session associated with the video stream.

16. The system of claim 15, wherein the video stream is an internet protocol (IP) media stream; wherein the receiver device is capable of receiving one or more of satellite television signals, broadcast television signals, a cable television signals; and wherein the IPG relates to a content item delivered through one or more of a particular satellite television signal, broadcast television signal, or cable television signal.

17. The system of claim 15, wherein selecting the at least one frame from the set of frames is performed according to a frame selection technique, the frame selection technique comprising one or more of keyframe extraction based on scene changes, frame sampling at predetermined intervals, or random frame sampling.

18. The system of claim 15, the operations further comprising:

analyzing the validated object metadata by matching metadata against a database of known objects.

19. The system of claim 15, the operations further comprising:

accessing contextual data relating to the playback session, the contextual data comprising user audio input received via an input device connected to the receiver device; and causing the trained neural network to use the validated object metadata and the contextual data to generate the set of recommended items.

20. The system of claim 15, the operations further comprising transmitting the set of recommended items to a computing system associated with at least one of a personal video recorder or a broadcast automation system.

* * * * *